ASYMMETRICALLY CONDUCTIVE DEVICE EMPLOYING SEMICONDUCTORS

Filed Dec. 31, 1957 5 Sheets-Sheet 1

INVENTOR.
STANLEY R. MORRISON
BY Arvin M. Haugen
ATTORNEY

INVENTOR.
STANLEY R. MORRISON
BY Irvin M. Haugen
ATTORNEY

ASYMMETRICALLY CONDUCTIVE DEVICE EMPLOYING SEMICONDUCTORS

Filed Dec. 31, 1957 5 Sheets-Sheet 3

INVENTOR.
STANLEY R. MORRISON

BY Irvin M. Haugen
ATTORNEY

INVENTOR.
STANLEY R. MORRISON

BY Orvin M. Haugen
ATTORNEY

INVENTOR.
STANLEY R. MORRISON
BY Orrin M. Haugen
ATTORNEY

United States Patent Office 3,021,433

Patented Feb. 13, 1962

3,021,433

ASYMMETRICALLY CONDUCTIVE DEVICE EMPLOYING SEMICONDUCTORS

Stanley R. Morrison, Hopkins, Minn., assignor to Minneapolis-Honeywell Regulator Company, Minneapolis, Minn., a corporation of Delaware Filed Dec. 31, 1957, Ser. No. 706,442

7 Claims. (Cl. 307—88.5)

The present invention relates generally to semiconductor apparatus and more specifically to such an apparatus which is responsive along at least the surface portion thereof to a minority current carrier generation therein. As is well known in the art today, these carriers may be generated in semiconductor bodies through various means, such as by injecting current through an electrical junction or the like, causing light of a certain desirable wave length to be impinged upon the body, or increasing the temperature of the body. Although somewhat higher temperatures are permissible with silicon, it has been determined that the temperature of the semiconductor bodies should be generally held below about 160° K. in order for the present effect to be properly detected and use made thereof. The effect is believed to be a surface phenomena based on the combination of current carriers, this phenomena being manifested in an initial change in conductance when the semiconductor body is placed in an electrical field, which conductance may drop or undergo decay substantially to a lower equilibrium value upon generation of the carriers in the body and in particular near the surface area under consideration. The rate of this decay is dependent upon the rate of generation of current carriers in the semiconductor.

Briefly, if at this temperature a thin slab of n-type germanium is employed as one plate of a "condenser" (a metal sheet as the other plate) and the resistance of the germanium is measured as a function of voltage applied to the "condenser," an interesting and useful effect is observed. With the application of the voltage, the conductance will change, then the conductance will decay back to an equilibrium and steady state value at a rate determined by certain current carrier generating parameters. If none of these parameters are supplied to the germanium body, the conductance will remain at the initial disturbed value for an indefinite period of time. If a short pulse only is supplied to the "condenser" of the appropriate sign, the conductance will change, and again the conductance decay will proceed according to the rate of generation of current carriers on one surface of the body until the normal steady state conduction is reached. The initial change in conductance may be designated $\Delta\sigma_{total}$ while the equilibrium condition with field applied may be designated $\Delta\sigma_{equil.}$ In normal operation using n-type germanium, the ratio of $\Delta\sigma_{total}/\Delta\sigma_{equil.}$ is in the range of one order of magnitude or even greater. This is adequate to permit operation and detection without the need of elaborate electrical or electronic components.

In FIGURE 2 there is shown the electrical response of a unit prepared and operated in accordance with the present invention, FIGURE 2 being typical of the conductance change as a function of time. When a negative field is applied, as at time $T_1$, the conductance abruptly changes due to the added charge induced by the field at these low temperatures. If the field is negative (the metal plate negative, the n-type germanium positive) the conductance slowly rises during the period the field is applied to a new steady state value designated $\Delta\sigma_{equil.}$ (time $T_1$ to $T_2$ in FIGURE 2). The rate of rise of conductance from $\Delta\sigma_{tot.}$ to $\Delta\sigma_{equil.}$ is a function of the rate at which minority current carriers are generated in or on the surface of the germanium body. When the negative field is removed, at $T_2$, the conductance very quickly returns to the steady state value. Depending on the intensity of the field, the thickness of the wafer and the like, a slight overshoot will occur upon removal of the field at $T_2$. As will be explained later, the degree of overshoot may be minimized by appropriate physical and electrical design of the unit. If the positive field is applied, as at $T_3$, the conductance rapidly attains the new steady state value, this being a change to a higher degree of conductance. However, when the positive field is removed, the conductance overshoots the value for high field as at $T_4$ in FIGURE 1 and then slowly decays back to its steady state value. The present invention employs this decay phenomena in operation, and accordingly this rate of decay provides a very useful effect for various operations.

Among the uses of a device employing this effect are, for example, photosensitive devices. Inasmuch as the rate of decay following the application of a pulse to the condenser arrangement is sensitive to illumination, a useful illumination detector may readily be fabricated. With the use of modest equipment, wave lengths smaller than about 1.8 microns may be readily detected.

Another use for the device is found in heat detection since the rate of decay from the initial disturbed value to the equilibrium or undisturbed value is sensitive to heat.

Still another use for this device is found in current measurement inasmuch as current passing through an injecting contact or junction on the semiconductor will increase the rate of the conductance decay. In the same manner, voltage pulse detection and measurement may be carried with the device.

Still another use for the apparatus is in storage of information regarding any of the above measurements. Inasmuch as the conductance does not appreciably change with time unless some disturbance is applied, the device can be used not only to detect and measure light, heat, positive pulses etc., but to hold the information regarding the disturbance within limits for an indefinite period of time.

The apparatus when provided with an electrical junction may also be employed as a memory unit sensing signal to be supplied by a positive pulse, held indefinitely, or erased by injection of pulses. It will store information concerning the presence or absence of the positive pulse and also information concerning the magnitude of the positive pulse if desired. This apparatus may also be used as a coincidence indicating device should one take advantage of the conductance decay which progresses during the application of these disturbances and which decay ceases after the application of disturbances is terminated. In addition, the device has the interesting property of responding only to positive pulses at the junction during the application of negative field, however, upon using a material of opposite conductivity type, reverse polarity may be employed with comparable results. Accordingly, the device may be employed as an asymmetrical circuit element taking advantage of these various properties and circuitry applications.

Accordingly, it is an object of the present invention to provide a circuit element which has a certain extrinsic conductivity, this conductivity being capable of modification under the application of an electrical field, and accordingly seeking an initially modified or disturbed level, this disturbed level decaying back to an intermediate level at a rate determined by the generation of minority current carriers along a surface or in the body of the device.

It is a further object of the present invention to provide a semiconductor photosensitive device, the photosensitive device utilizing the rate of decay of conductance following an initial modification of conductivity by an electrical field as an indication of the intensity of illumination.

It is still another object of the present invention to provide a semiconductor apparatus capable of operation as a heat detector, the device giving an electrical indication of the temperature as determined by the rate of decay of the disturbed conductivity.

It is yet another object of the present invention to provide a circuit device which is capable of exhibiting a first disturbed conductance level, this level being capable of decaying back to a second or intermediate level, this rate of decay being sensitive to generation of minority carriers along a surface of the device.

Other and further objects of the present invention will become apparent upon a study of the following specification, appended claims, and accompanying drawings wherein:

Figure 3:
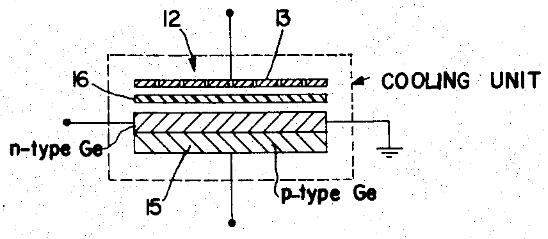
FIGURE 3 is a schematic view of a certain modification of the present invention employing an electrical junction along a surface thereof.

According to a simple modification of the present invention, a body of n-type germanium 10 is placed within a cryostat or low temperature enclosure 11 which is capable of maintaining the temperature of the germanium in the range below about 160° K. Accordingly, these temperatures are in the range of liquid nitrogen and the like. If silicon is employed in a semiconductor element, temperatures as high as that of Dry Ice may be employed, however temperatures below about 160° K. are generally preferred. If desired, the cryostat may be designed in such a manner that the temperature of the device may be employed as one of the parameters, however in general it is desired that the cryostat maintain a constant temperature preferably in the range below 160° K. There is further provided an electrical condenser arrangement generally designated 12 wherein the semiconductor wafer is employed as one plate of the condenser and a conductor 13 spaced therefrom is employed as the other plate, air or any other desirable medium being employed as a dielectric. If it is desired to use intensity of illumination as a parameter for causing the rate of change of conductance to be measured, it is desirable to place a plurality of holes 14—14 in the body which is employed as the second plate of the condenser arrangement thereby permitting light or other electromagnetic radiation to pass on to the surfaces of the semiconductor body. Appropriate circuitry is provided in the above device including means for measuring the conductance of the sample. If desired, an electrical junction such as an alloyed junction or the like may be provided in the germanium wafer as indicated in the device of FIGURE 3, this junction preferably being removed from the surface zone which forms the condenser together with the other conductor. This arrangement enables injection of current carriers into the device should either the condenser field or injection current be employed as the parameter for fixing the rate of decay of conductance. Of course, it is essential that appropriate electrical power sources be provided in order to effectively operate the device.

The characteristics for a device of the type shown in FIGURE 3 are as follows. If a positive pulse is applied to the control element 13, a "permanent" change in the anode voltage from its equilibrium value is observed due to the change of the resistance of the semiconductor. Anode voltage may be defined as the voltage observed between the ohmic contacts. This change can be erased by an injecting pulse from the quencher or p-type region 15. If, on the other hand, a negative pulse is applied to the control element 13, a corresponding pulse is observed on the anode, however no such "permanent" change in anode voltage is observed. If the quencher has a steady state injecting voltage applied, the control element has no effect on the anode voltage. Accordingly, the resistance or the conductance of the unit is maintained constant.

These various characteristics may be utilized in the following manner for circuitry applications. In order to employ the unit as illustrated in FIGURE 3 as a memory element, the effect of a positive pulse to control plate 13 can be retained indefinitely, or it can be erased at will be a pulse on the quencher. The unit can act as a gate, passing only negative pulses if the quencher has no applied voltage. The unit can also act as a coincidence gate. If the quencher is normally injecting, a pulse will be felt on the anode only if a negative pulse arrives simultaneously at the control element and at the quencher; a pulse at only one of these will not be transmitted to the anode. Inasmuch as the speed of response of the device depends exponentially on the field applied between the germanium body and the control element, substantially higher fields may be employed by using a dielectric material between the semiconductor wafer and the control plate such as is illustrated by the dielectric material 16 in FIGURE 3. The rate of erasing a signal is also a function of the current supplied to the quencher during the pulse. Moderate currents (about 4 mils) may be used to erase a signal applied to the control element with reasonable pulse tension. In this connection, the quencher may be used to inject current at a minimum pulse length at $10^{-4}$ seconds, but presumably a shorter pulse length could be used with a correspondingly higher current, such as in the range of $10^{-5}$ seconds.

One problem which is particularly critical in the design of devices of the sort shown in FIGURE 3 is the thickness of the semiconductor wafer. Accordingly, a minimum thickness will eliminate problems of overshoot upon erasing the signal by means of an injected current pulse. In other words, when current carriers are injected through the quencher, the conductance of the unit overshoots the equilibrium value, becoming too large. In other words, the value exceeds the undisturbed condition when a heavy quenching pulse is applied to the unit. Under some conditions, several seconds or more may be required to permit the unit to return to its equilibrium value. It will be understood of course, that the degree of overshoot depends upon the magnitude of the injecting pulse to the quencher, and it will be appreciated that the overshoot is not generally serious if the injecting pulse is held to a reasonable magnitude. Inasmuch as the overshoot may be caused at least in part by a bulk trapping of holes in n-type material or electrons in p-type material, a thin wafer will obviously be preferred. This phenomena may lead to a temporary increased conductance which will itself decay away quite slowly as opposed to the surface conductance phenomena under consideration here which actually decays away relatively rapidly. The overshoot is not dependent upon the field applied at the control element and hence an increase in the field should decrease the relative magnitude of overshoot.

Another feature of the device illustrated in FIGURE 3 is the effect of a repetition of several distinct pulses to the quencher. This may be accomplished while the field is either at a static level or if the field is being pulsed according to a predetermined pattern. It appears that the extent of effectiveness of the quencher is the integrated value of the current supplied to the quencher and hence decay of the conductance to its equilibrium value can be accomplished by a plurality of quencher pulses, each working in an additive manner.

Figure 1:
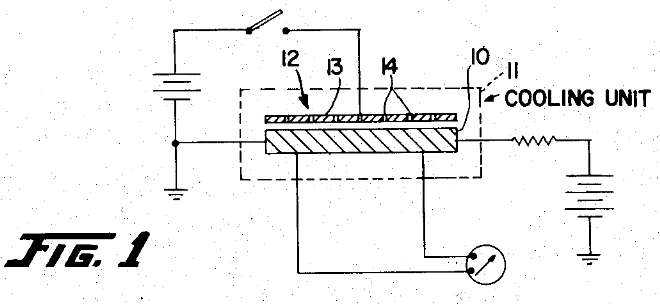
FIGURE 1 is a schematic drawing of a simple modification of the present invention showing certain accompanying circuitry which may be employed to operate the apparatus.

In the following discussion relative to performance of devices as a function of light intensity and wave length, a germanium sample wafer has been employed having n-type conductivity in the resistivity range of about 11 ohm-cm. at room temperatures, and having dimensions of 400 mils x 80 mils x 20 mils thick. Inasmuch as injection of current carriers will not be considered as a parameter, this unit is not provided with an electrical junction for that purpose. The device therefore is fabricated in accordance with FIGURE 1 and temperature is maintained in the range of liquid nitrogen for measurement of these parameters. Contacts were placed on the opposite face from the metal plate used for the application of the electric field, however these contacts may be positioned on opposite edge surfaces of the device. While it is important to have a uniformly clean surface, it does not appear that the surface etch treatment is critical in the fabrication of these devices and accordingly any suitable etch such as CP-4 or the like may be employed. In similar fashion, a junction unit may be prepared in accordance with the device illustrated in FIGURE 3 of the drawings, the n-type germanium which carries a donor impurity preferably antimony has diffused or alloyed thereinto a quantity of indium to form the p-type zone 15 therein. Such an apparatus may be employed where an electrical signal is desired for generation of carriers in the device. In either case, application of electrode leads or the like are accomplished in accordance with conventional procedures.

Figure 4:
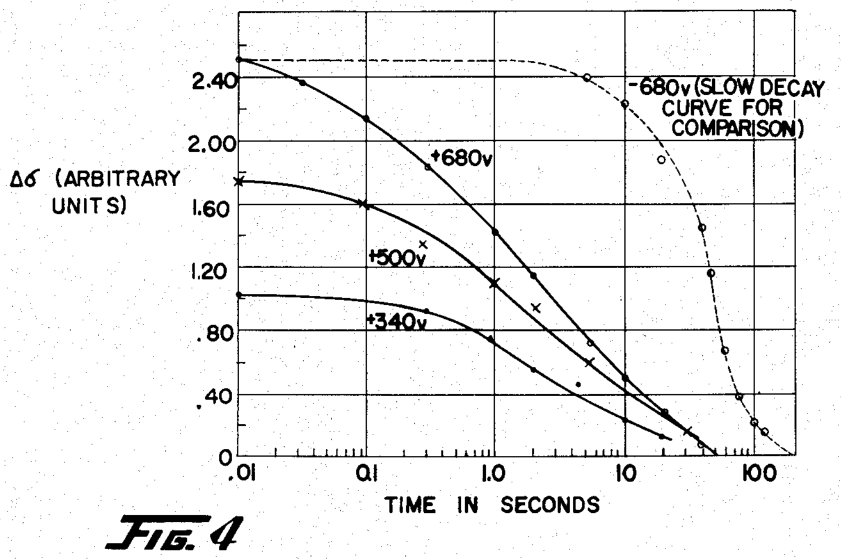
FIGURE 4 is a graphic illustration of a characteristic of the present invention plotting the conductance vs. time under constant illumination and showing the rate of change of conductance as compared between a fast and a slow rate of decay.

FIGURE 4 illustrates a typical plot of change in conductance with respect to the log of time for fast decay characteristics under conditions of constant illumination. This plot enables a more critical evaluation of the short times involved for the fast decay phenomena associated with a device prepared in accordance with either FIGURE 1 or 3.

*The effect of the decay characteristics of a variation in light intensity and wavelength*

Figure 5:
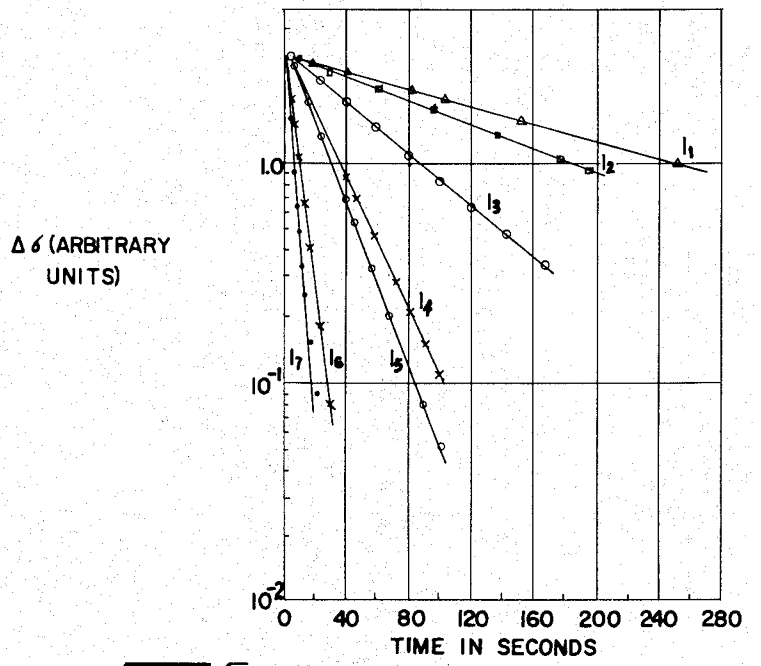
FIGURE 5 is a graphic illustration of conductance vs. time wherein a varying intensity of illumination is employed as a parameter giving various rates of conductance decay.

The variation of the slow decay characteristics with varying intensities of illumination is shown in FIGURE 5. Here, the intensities of illumination from I–1 to I–7 are plotted in order of increasing intensity. A constant magnitude of applied field was utilized throughout. It will be seen that the decay in conductance is substantially a logarithmic function of time.

Figure 6:
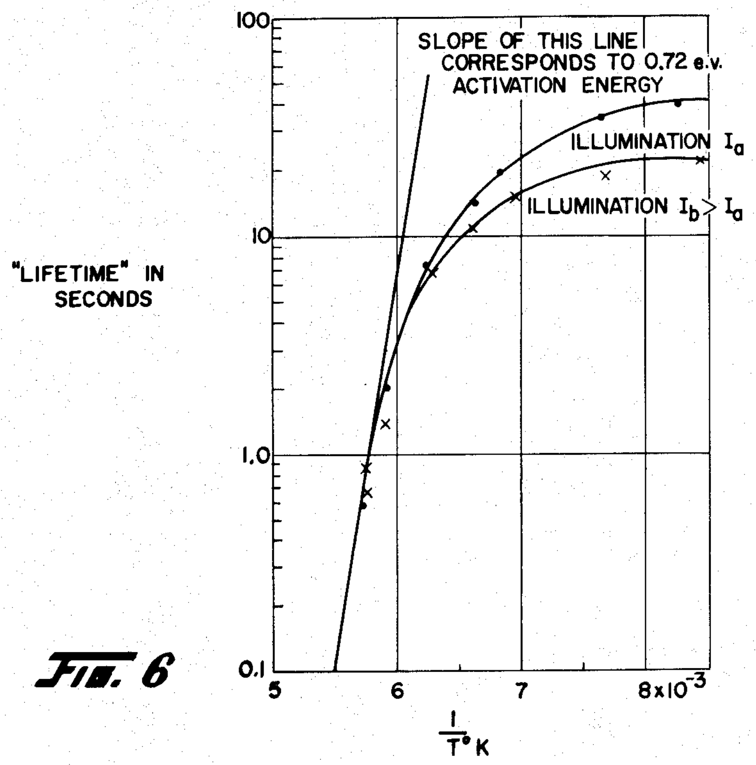
FIGURE 6 is a graphic illustration of the "lifetime" in seconds vs. the reciprocal of temperature and showing intensity of illumination as a parameter.

The graph of FIGURE 6 is intended to illustrate the variation of the slow decay characteristics with illumination intensity and as a function of temperature. This graph plots the "lifetime" of the current carriers in seconds against the reciprocal of absolute temperature. At relatively high temperatures, it is seen that the "lifetime" is independent of the intensity of illumination while at lower temperatures particularly in the range of liquid nitrogen, the intensity of illumination has a substantial effect upon the "lifetime" of carriers.

Figure 7:
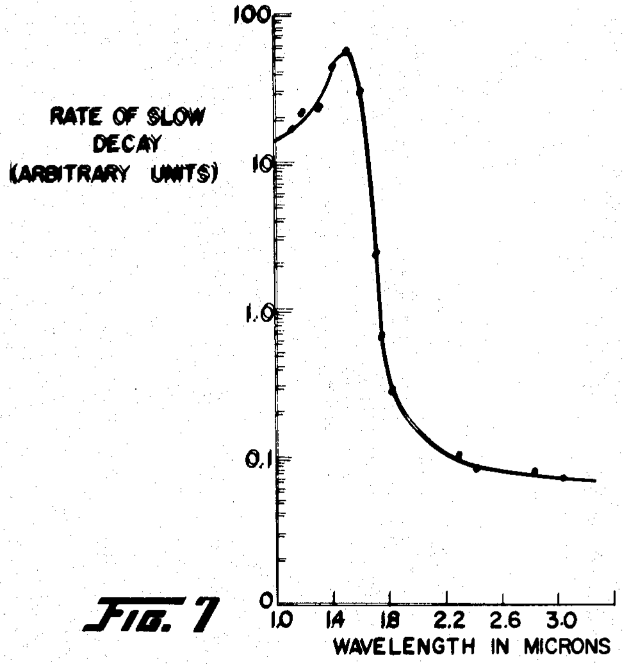
FIGURE 7 is a graphical illustration of the rate of slow decay vs. wave length of applied illumination in microns and showing the relative response of the device to certain illumination and its sensitivity thereto.

A study of the electrical response as a function of the wave length of the illumination has been made and this is shown graphically in FIGURE 7 of the drawings. It is seen that the maximum rate of response is in the range shorter than about 1.8 microns, and the response is somewhat slower at longer wave lengths.

Figure 2:
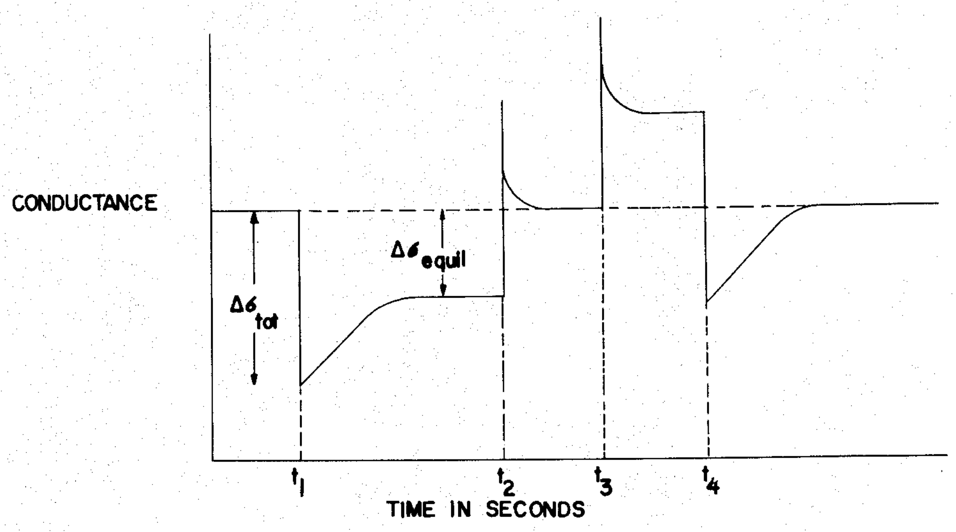
FIGURE 2 is a graphic illustration of the responsive apparatus operating in accordance with the present invention and showing the conductance of the device and the decay thereof with respect to time for certain operations employing illumination as a parameter.
Figure 8:
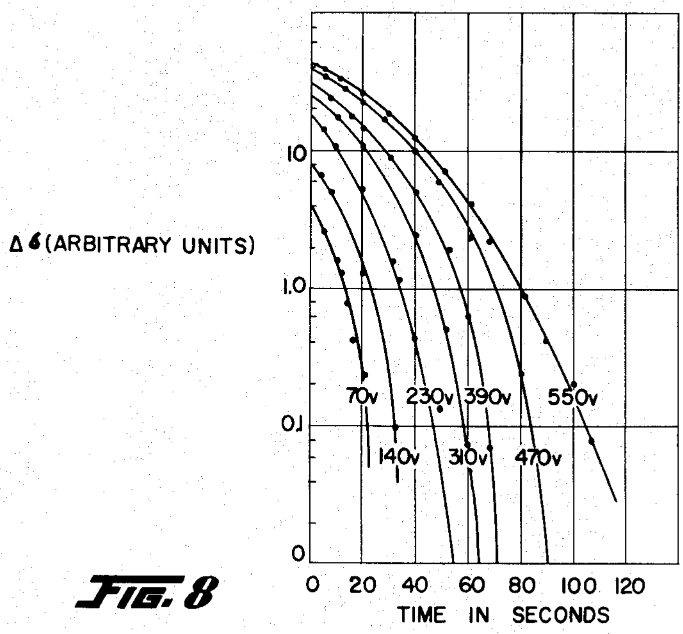
FIGURE 8 is a graphical illustration of conductance vs. time for p-type silicon utilizing intensity of applied field as a parameter and illustrating the rate of slow decay phenomena.
Figure 9:
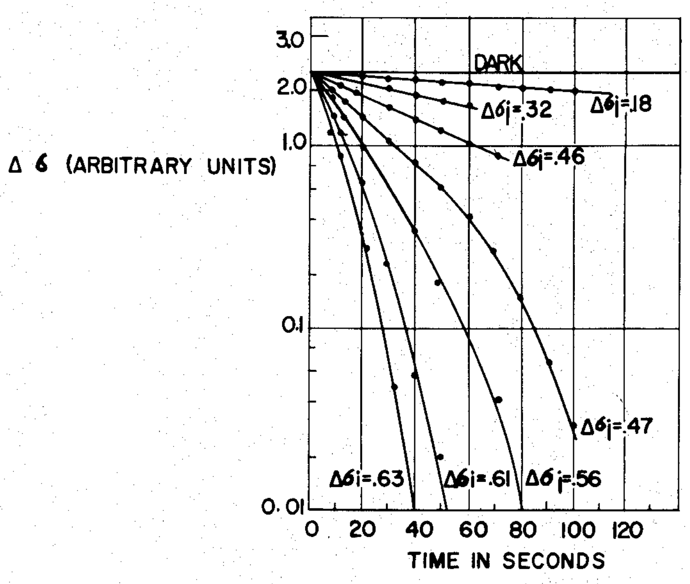
FIGURE 9 is a graphical illustration of conductance vs. time for p-type silicon utilizing intensity of illumination as a parameter and illustrating the rate of slow decay.

The slow decay characteristics for p-type silicon at liquid air temperatures with applied field and illumination as parameters respectively are illustrated graphically in FIGURES 8 and 9. The fast decay was not measurable with any available equipment inasmuch as it was virtually complete in less than $10^{-4}$ seconds, with applied fields as low as 15 volts. Lower field voltages introduce a greater proportion of error and hence are not considered significant. The sample employed was a wafer of p-type silicon having a resistivity in the range of 15 ohm-cm. and having dimensions of 400 mils x 80 mils x 20 mils thick. With p-type silicon, the slow decay occurs upon making the field more positive (metal plate more positive). The ratio of $(\Delta\sigma_{\text{equil.}})/(\Delta\sigma_{\text{tot.}})$ (see FIGURE 2) is different also. In contrast, with n-germanium the ratio is of the order of 0.1, with p-germanium the ratio is of the order of 0.5; and with p-silicon the ratio is nearly 0. The fractional conductance decay for various illumination intensities is shown in FIGURE 9. The illumination intensity is expressed in terms of the photoconductance $\Delta\sigma_1$ in arbitrary units.

Figure 10:
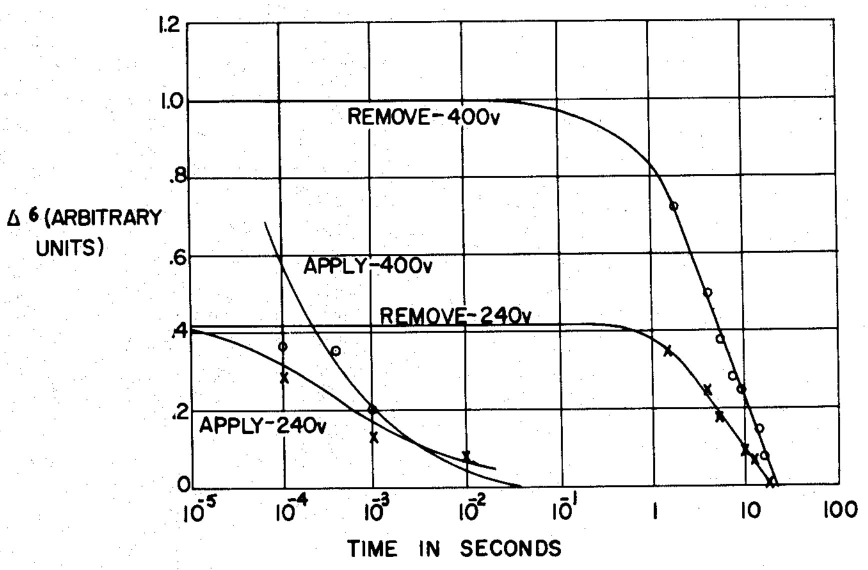
FIGURE 10 is a graphical illustration of conductance vs. time wherein pulses of short duration have been applied to a body of p-type silicon.

The asymmetrical decay on p-silicon was measurable at the temperature of Dry Ice. The results are illustrated in FIGURE 10 of the drawings. At this temperature the asymmetric decay was obscured by a simultaneous symmetric decay. This was overcome by pulsing the negative field for a short time, the order of 0.1 second. As abserved in FIGURE 10, this was sufficient to bring an asymmetric trap to a new steady state, but as the asymmetric decay had time constants the order of 10 seconds, the pulse should not disturb these traps.

Accordingly, it is seen that the temperature should be held to a level below about 195° K. for silicon, and preferably below about 160° K. as in germanium.

Figure 11:
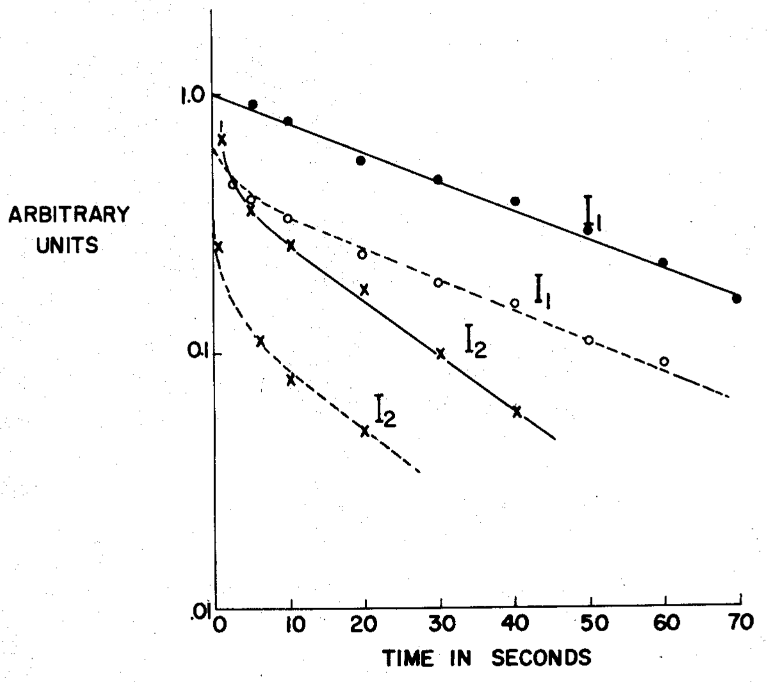
FIGURE 11 is a graphical illustration of the effect of illumination as a parameter for both fast and slow rates of decay.

Fast and slow decay curves the p-type germanium at liquid nitrogen temperatures as shown in FIGURE 11 for two given illumination intensities. In this connection, I–2 is greater than I–1.

Although various specific embodiments of the present invention have been disclosed herein, it will be appreciated that they are shown herewith for purposes of illustration only and accordingly there is no intention of limiting the scope of the coverage herein to these particular embodiments.

I claim:

1. Asymmetrical conducting apparatus including a semiconductor body taken from the class consisting of germanium and silicon and having resistivity above about 10 ohm-cm. and having a pair of spaced ohmic contacts situated thereon defining a surface zone and current path therebetween, means for establishing an electrical current flow along said path, means for generating an electrical field adjacent said body and said current path, means for radiating said surface zone with electromagnetic wave energy having a wavelength which is below about 1.8 microns, and means for maintaining said body at a temperature below 195° K.

2. Asymmetrical photosensitive apparatus including an n-type germanium semiconductor body having a resistivity above about 10 ohm-cm. and having a pair of spaced ohmic contacts situated thereon defining a surface zone and a current path therebetween, means for establishing an electrical current flow along said path, means for generating an electrical field adjacent said body and said current path, means for radiating said surface zone with electromagnetic wave energy having a wavelength below 1.8 microns, and means for maintaining said body at a temperature below 160° K.

3. Asymmetrical conducting apparatus including a semiconductor body selected from the class consisting of germanium and silicon and having a pair of ohmic contacts thereon defining a current path therebetween, said body having a certain predetermined value of electrical conductivity, means for establishing an electrical current flow along said path, means for generating an electrical field adjacent said body and said path, said field being of a magnitude such that said predetermined electrical conductivity is substantially altered, means for generating minority current carriers in said semiconductor body adjacent to said path thereby causing said conductivity to decay toward said predetermined value, and means for maintaining said semiconductor body at a temperature level below 195° K.

4. Asymmetrical conducting apparatus including a semiconductor body having a pair of ohmic contacts thereon defining a current path therebetween, said body having a certain predetermined value of electrical conductivity, means for establishing an electrical current flow along said path, means for generating an electrical field adjacent said body and said path, said field being of a magnitude such that said predetermined electrical conductivity is substantially altered, means for radiating said surface zone with electromagnetic wave energy thereby causing said conductivity to decay toward said predetermined value, and means for maintaining said semiconductor body at a temperature level below 160° K.

5. Asymmetrical conducting apparatus including a semiconductor body selected from the class consisting of germanium and silicon having a pair of ohmic contacts thereon defining a current path therebetween, said body having a certain predetermined value of electrical conductivity, means for generating an electrical field adjacent said body and said path, said field being of a magnitude such that said predetermined electrical conductivity is substantially altered, means for injecting minority current carriers into said semiconductor body adjacent to said path thereby causing said conductivity to decay toward said predetermined value, and means for maintaining said semiconductor body at a temperature level below 160° K.

6. Condition responsive apparatus including a semiconductor body selected from the class consisting of germanium and silicon which has a certain predetermined conductivity, condenser means for applying an electrical field about said body of such a magnitude so as to alter the conductivity of said body to a second predetermined value, means for generating minority current carriers along a surface of said body at a rate sufficient to cause said conductivity to decay from said second predetermined value back to said first predetermined value, and means for maintaining said semiconductor body at a temperature level below 160° K.

7. Asymmetrical conducting apparatus including a semi-conductor body of predetermined resistivity having a pair of spaced ohmic contacts thereon defining a current path therebetween, means for establishing an electrical current flow along said path, means for generating an electrical field gradient adjacent said body and adjacent said current path to alter said predetermined resistivity, means for generating minority current carriers in said semi-conductor body adjacent to said path, and means for maintaining said semi-conductor body at a temperature level below 195° K.

References Cited in the file of this patent

UNITED STATES PATENTS

| | | |
|---|---|---|
| 2,704,431 | Steele | Mar. 22, 1955 |
| 2,725,474 | Ericsson et al. | Nov. 29, 1955 |
| 2,763,832 | Shockley | Sept. 18, 1956 |
| 2,891,160 | Leblond | June 16, 1959 |
| 2,900,531 | Wallmark | Aug. 18, 1959 |
| 2,944,167 | Matare | July 5, 1960 |